Sept. 7, 1965 T. R. STOCKTON 3,204,411
HYDROSTATIC DRIVE
Filed April 6, 1964 2 Sheets-Sheet 1
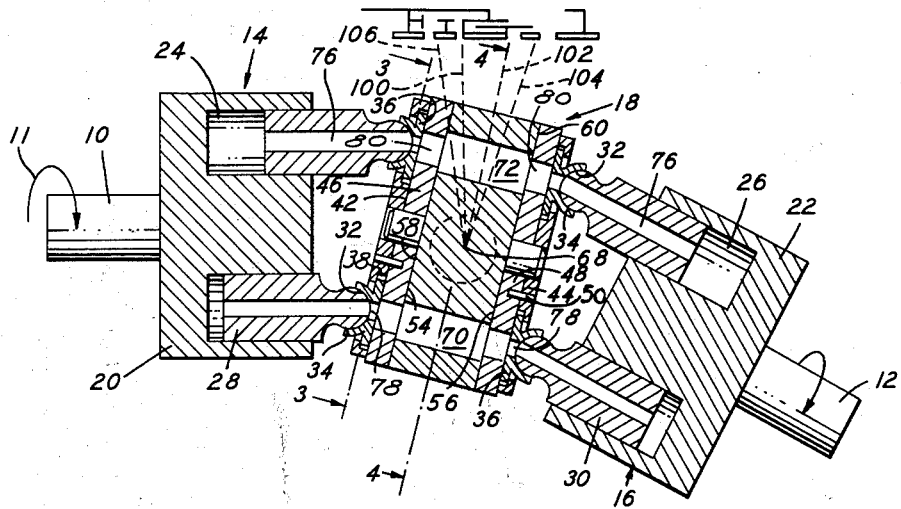
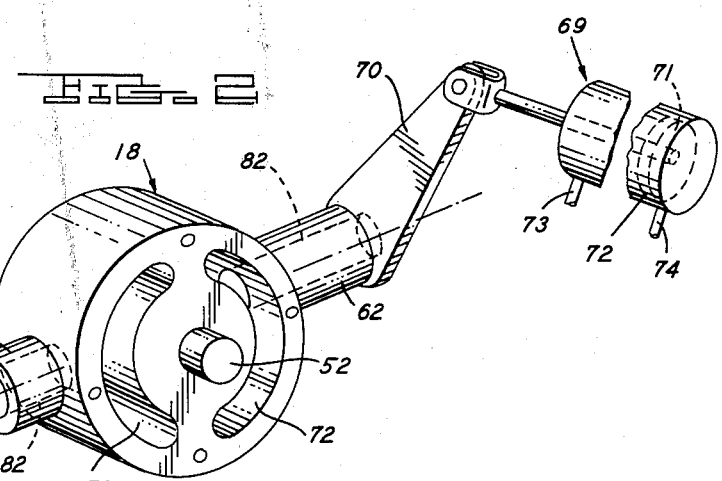
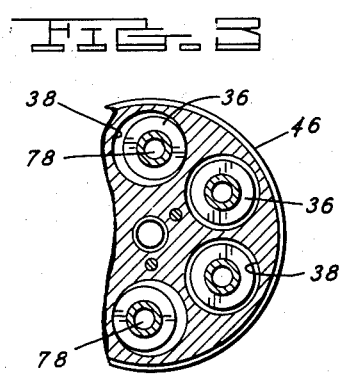
THOMAS R. STOCKTON
INVENTOR
ATTORNEYS

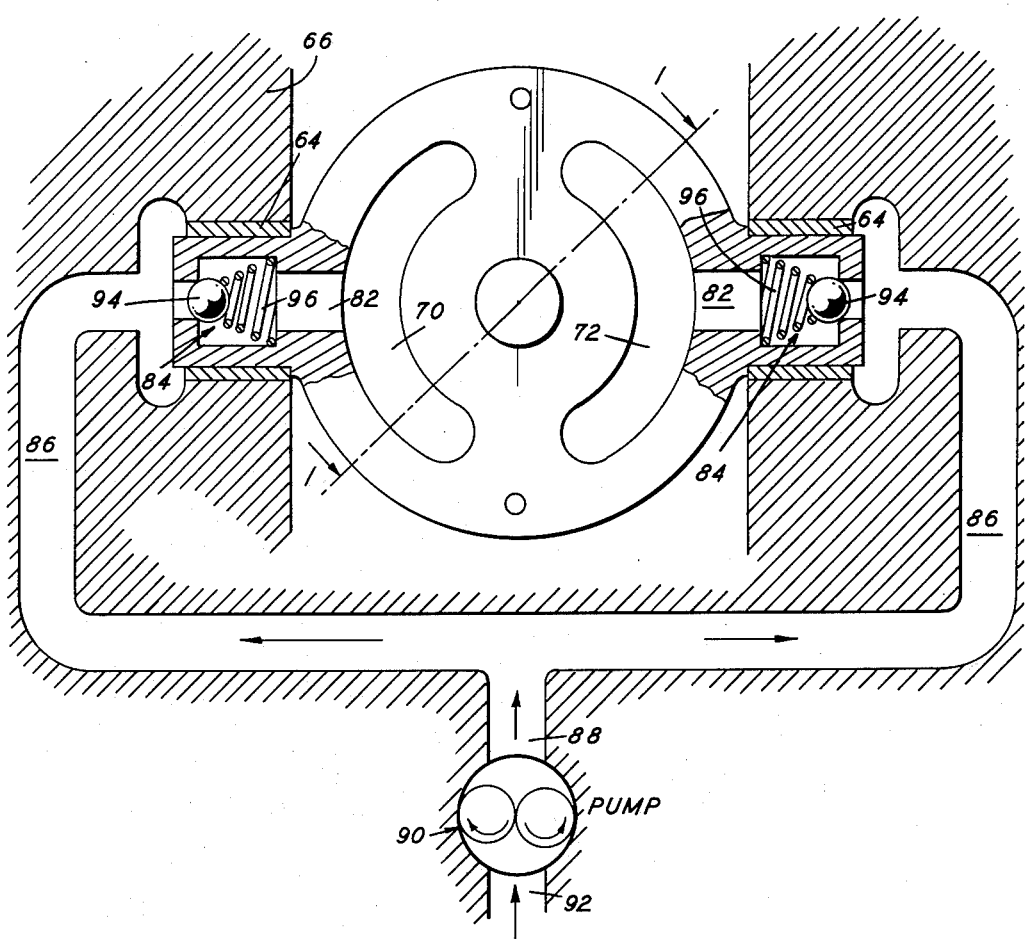

United States Patent Office
3,204,411
Patented Sept. 7, 1965

3,204,411
HYDROSTATIC DRIVE
Thomas R. Stockton, Northville, Mich., assignor to Ford Motor Company, Dearborn, Mich., a corporation of Delaware
Filed Apr. 6, 1964, Ser. No. 357,559
5 Claims. (Cl. 60—53)

This invention relates to a hydrostatic torque transmitting device. More particularly, it relates to one having a number of interconnected variable displacement hydrostatic units.

In general, many multiple hydrostatic unit drives include a separate swash plate for each variable displacement unit. This not only results in a large over-all package, but an infinitely variable speed drive that is costly to manufacture and complex in construction.

The invention provides a simplified multiple hydrostatic unit drive having only one swash plate for controlling the fluid displacements of all of the units. Each of the units has a rotating but non-tiltable cylinder block connected to the same stationary, tiltable swash plate.

It is a primary object of the invention, therefore, to provide a hydrostatic torque transmitting device having more than one variable displacement hydrostatic unit, all controlled by a single swash plate.

Another object of the invention is to provide a hydrostatic drive device that is simple in construction, economical to manufacture, and is of a size that is small in comparison to known multiple hydrostatic unit drives.

A further object of the invention is to provide an infinitely variable speed drive device having a plurality of hydrostatic units that are hydraulically interconnected in a closed fluid circuit for the drive of the units by each other, the drive being varied by tilting a single swash plate to simultaneously change the displacements of all the units.

It is a still further object of the invention to provide an infinitely variable speed drive consisting of a number of variable displacement hydrostatic units in opposed relationship, each having a rotatable but non-tiltable cylinder block with movable pistons, the pistons being connected by slippers to valve plates rotatably mounted on a non-rotatable but tiltable swash plate common to all of the units. The swash plate has short high and low pressure fluid passages connected at opposite ends to aligned passages through the valve members, slippers, and pistons of the units.

Other objects, features, and advantages will become apparent upon reference to the succeeding, detailed description of the invention, and to the drawings illustrating the preferred embodiment thereof; wherein, FIGURE 1 shows, schematically, a cross-sectional view of one embodiment of the invention; taken on a plane indicated by and viewed in the direction of the arrows 1—1 of FIGURE 4;

FIGURE 2 shows a perspective view of the swash plate of FIGURE 1, together with other details;

FIGURE 3 shows a cross-sectional view of the drive slippers and valve plate of FIGURE 1, taken on a plane indicated by and viewed in the direction of the arrows 3—3 of FIGURE 1; and, FIGURE 4 shows an enlarged cross-sectional view of the fluid make-up system for the drive device of FIGURE 1, taken on a plane indicated by and viewed in the direction of the arrows 4—4 of FIGURE 1.

FIGURE 1 shows an infinitely variable speed drive device having, in general, a power input shaft 10, a power output shaft 12, and variable displacement hydrostatic pump and motor units 14 and 16 controlled by a single swash plate 18. The units are hydraulically interconnected, in a manner to be described, by a closed fluid circuit for the drive of either of the units by the other.

More specifically, input shaft 10 is driven in a clockwise direction (arrow 11) by any suitable source of power, such as, for example, an internal combustion engine, an electric motor, or the like. The input and output shafts are fixed to the cylinder blocks 20 and 22 of the pump and motor units 14 and 16, respectively. Since both the pump and motor units are similar in construction, only reversed in position, they will be described together. Both of the cylinder blocks 20 and 22 are rotatably mounted in a stationary housing, not shown, by suitable bearing means. They are free to rotate with their respective input and output shafts, but, otherwise, are fixed against any other type of motion, such as tilting about their axes of rotation. The blocks each have a number (only two shown) of circumferentially spaced bores 24, 26 slidably and sealingly receiving axially reciprocable pistons 28, 30. Each of the pistons has a ball end 32 universally movable in a spherical socket 34 projecting from an annular slipper member 36. The bases 38 of the slippers are mounted in oversize counterbores 40 (FIGURES 1 and 3) in a pair of annular drive plates 42 and 44. The larger diameter of the counterbores permits a slight radial adjustment of the slippers relative to the plates, for a purpose to be described.

The drive plates are secured to cylindrical valve plates 46 and 48 by pins 50. The drive and valve plates are rotatably mounted on shafts 52 projecting from opposite lateral sides of the stationary cylindrical swash plate 18. The valve plates, inner faces 54 and 56 slide on the stationary faces 58 and 60 of the swash plate. The particular dimensions of the interconnected parts and the angular relationships between them are such that the axial forces exerted by the pistons maintain the slippers and valve plates against the faces of the swash plate 18 in a fluid sealing manner.

As best seen in FIGURES 2 and 4, swash plate 18 has a pair of trunnion mounts 62 projecting from its opposite portions. These mounts are journaled on bearing surfaces 64 secured in a housing 66 to permit a tilting movement of the swash plate about one axis 68 while preventing a rotation of the plate about the axis of shafts 52. The swash plate is tilted by actuating a servo 69 to rotate a lever 70 fixed to the trunnion 62. The servo is of a known type, having a piston 71 slidable within a cylinder 72 upon admission of fluid to either side of the piston through lines 73 and 74.

As will be seen in FIGURE 3, the connection between the slippers 36 and the drive plates 42 and 44 serve as the driving connections between input shaft 10 and rotary valve plate 46, and valve plate 48 and output shaft 12. The radial sliding fit between the slippers and drive plate counterbores permits the swash plate tilting movement described to vary the pump and motor fluid displacements without setting up an interference fit of pistons 28 and 30 in their bores 24 and 26.

The swash plate is formed with a pair of kidney-shaped fluid passages 70 and 72 that extend straight through the swash plate from one lateral face 58 to the other 60. As will be described more clearly later, these constitute high and low pressure passages, depending upon which of the hydrostatic units 14 or 16 is the driver at the time. As best seen in FIGURE 1, passages 70 and 72 receive fluid from the cylinder bores 24 of the block 20 and bores 26 of block 22 through aligned straight bores 76, 78 and 80 in each of the pistons 28, 30, slippers 36, and rotary valves 46 and 48, respectively.

The hydrostatic unit as a whole is a closed fluid circuit type. That is, initially the various passages are filled with operating fluid, and the inlet then is blocked. Subsequent displacement of the fluid from the various bores of the pump unit 14 to motor unit 16, and return, in a manner to be described, causes circulation of fluid between the units for the drive of one by the other by the use of the same fluid.

In such a system, however, internal fluid losses due to heating, or minute leaks along the rotary valve faces and slipper faces, for example, are inevitable. The fluid make-up system shown in FIGURE 4 solves this problem by maintaining the system full at all times. It also provides for the initial fill of the system. As shown, each of the swash plate trunnions 62 is bored to provide a fluid make-up passage 82 that intersects a main passage 70 or 72. The passages 82 are connected at their opposite ends through check valves 84 to fluid lines 86. These latter lines are branches of a line 88 connected to the outlet of a make-up pump 90. The pump is shown as being of the gear type, and is driven by the input shaft 10 through a connection not shown. The pump has an inlet 92 leading to a fluid sump, also not shown.

The check valves 84 control the admission of make-up fluid to the system, and prevent escape of the fluid in the main passages 70, 72 to the sump. That is, each is a non-return flow type having a ball check member 94 biased by a spring 96 to a position closing the connection between passages 70 and 86 and 72 and 88. In operation, the check valve associated with the lowest pressure line will open whenever the fluid pressure in that line drops sufficiently below the output pressure of pump 90 that the ball valve 94 will unseat. Then fluid from pump 90 will enter the main passage 70 or 72 and return the pressure to the proper operating level.

As seen in FIGURE 1, tilting of the swash plate about its axis 68 by servo 69 simultaneously varies the displacements of both pump unit 14 and motor unit 16. When the swash plate is tilted or stroked to the vertical or neutral position 100, the pump pistons 28 will be in vertical alignment with each other, and the pump unit will have a zero fluid displacement. Simultaneously, the motor unit pistons 30 will have been moved to provide a high fluid displacement of the motor. Tilting the swash plate 42 to the mid-position 102 conditions the hydrostatic units for an intermediate drive of output shaft 12. Tilting the swash plate to the position 104 will establish an overdrive condition by stroking the pump unit for a maximum fluid displacement, and the motor unit 16 for a zero fluid displacement. This causes the cylinder block 22 to rotate at the speed of the pump block 20. Moving the swash plate to the left past the neutral position 100 to position 106 conditions the pump unit for a small fluid displacement, and strokes the motor unit for a maximum displacement, while at the same time conditioning the motor unit for a reversal in the direction of rotation.

It will be clear that a clockwise drive of pump 14, when swash plate 18 is in the forward drive positions 102 or 104, provides a counterclockwise drive of output shaft 12. This is due to the fact that a clockwise movement (arrow 11) of the pump piston 28 from its top position, for example, in FIGURE 1 to the bottom position, during its compression or pressure stroke, forces fluid from the right-hand side of the pump through the connected passages 76, 78, 80 and the kidney-shaped passage 72 to the right-hand motor cylinder bores. Since the swash plate is stationary, the motor cylinder block 22 must rotate in a counterclockwise direction to increase the cylinder bore volume enough to handle the volume of fluid from the pump. The fluid displaced by the opposite motor pistons 30 is fed back through swash plate passage 70 to the left-hand piston bores 24 in the pump cylinder block. When the pump unit is stroked to its reverse drive operation 106, this reverses the pump high and low pressure sides, and forces the motor block 22 to reverse its direction of rotation.

In over-all operation, if the swash plate 18 initially is rotated to its neutral position 100, the pump unit 14 will not displace any fluid to the motor, and output shaft 12 will remain stationary. If swash plate 18 now is tilted to the reverse position 106, clockwise rotation of the pump cylinder block 20 will cause a corresponding clockwise rotation of motor cylinder block 22 and output shaft 12, in the manner previously described. Progressively rotating the swash plate to its mid-position 104 provides a progressively increasing intermediate speed drive of output shaft 12 in a direction opposite to that of drive shaft 10.

If, during this drive condition, the input speed is reduced, the output shaft 12 will convert the unit 16 into a pump and the unit 14 will act as a motor. The resistance to rotation of the input shaft 10 faster than it is being driven by its power source will then provide a braking effect on the coast drive of output shaft 12.

Finally, progressively tilting the swash plate 18 to its maximum overdrive position progressively strokes the pump unit 14 toward a maximum fluid displacement, and the motor unit 16 toward a zero fluid displacement. This causes the cylinder block 22 to rotate at the speed of its pistons 30 and therefore, at a speed slightly in excess of that of the pump 14.

Frome the foregoing, it will be seen that the invention provides a hydrostatic drive that includes a number of variable displacement hydrostatic units all controlled by a single swash plate member. This single member provides a progressive drive of the output shaft from the input shaft in a sequential manner by the simultaneous variation of the fluid displacements of the pump and motor units.

While the invention has been illustrated in its preferred embodiment, it will be clear to those skilled in the arts to which the invention pertains that many changes and modifications may be made thereto without departing from the scope of the invention.

I claim:

1. An infinitely variable speed driving device comprising, a plurality of spaced variable displacement hydrostatic units of the reciprocating piston type interconnected by a closed fluid circuit for a drive of said units by each other, and an adjustable swash plate means between and common to said units and operably connected to each for concurrently varying the fluid displacements of said units to vary the drive therebetween upon adjustment of said plate means.

2. An infinitely variable speed driving device comprising, rotatable first and second variable displacement hydrostatic units of the reciprocating piston type interconnected by a closed fluid circuit for a drive of one of said units by the other, and a tiltable stationary swash plate means common to said units and operably connected to the pistons of each for varying the drive between said units by concurrently varying the fluid displacements of said units by tilting of said plate means.

3. An infinitely variable speed driving device comprising, first and second spaced variable displacement hydrostatic units of the axially movable piston type interconnected by a closed fluid circuit for a drive of one of said units by the other, said units having an adjustable swash plate means common to said units and operably connected to each for concurrently varying the fluid displacements of said units to vary the drive therebetween by adjustment of said swash plate means, said units having rotatable but non-tiltable cylinder blocks containing pistons therein, said swash plate means being non-rotatable and tiltably mounted between said blocks.

4. An infinitely variable speed drive device comprising, a pair of spaced variable displacement hydrostatic units hydraulically interconnected by a closed fluid circuit, said units each having a rotatable but non-tiltable cylinder block and a set of axially reciprocable pistons in said block and a tiltable but non-rotatable swash plate between and common to said units, said plate having a rotatable valve member on sides thereof adjacent said blocks, and means connecting the sets of pistons each to a different one of said valve members for rotation thereof upon rotation of said blocks, said pistons and valve members and swash plate having passages therethrough at times interconnected for the transfer of fluid between said units for the drive at times of one of said units by the other, and means to tilt said swash plate for simultaneously varying the fluid displacement of each of said units.

5. An infinitely variable speed drive device comprising, a pair of spaced variable displacement hydrostatic units hydraulically interconnected by a closed fluid circuit, said units each having a rotatable but non-tiltable cylinder block and a set of axially reciprocable pistons in said block, and a tiltable but non-rotatable swash plate between and common to said units, said plate having a rotatable valve member on opposite lateral sides adjacent said blocks thereof, and slipper means connecting the sets of pistons each to a different one of said valve members for rotation thereof upon rotation of said blocks, said pistons and valve members and swash plate having passages therethrough at times interconnected for the transfer of fluid between said units for the drive at times of one of said units by the other, and means to tilt said swash plate for simultaneously varying the fluid displacement of each of said units.

No references cited.

JULIUS E. WEST, *Primary Examiner.*